(12) United States Patent
Bahlenberg

(10) Patent No.: US 9,339,003 B2
(45) Date of Patent: May 17, 2016

(54) METHOD, COMPUTER PROGRAM, AND COMPUTER PROGRAM PRODUCT FOR CONTROLLING THE MILKING BY A MILKING DEVICE, AND A MILKING ARRANGEMENT

(71) Applicant: DELAVAL HOLDING AB, Tumba (SE)

(72) Inventor: Peter Bahlenberg, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

(21) Appl. No.: 14/436,904

(22) PCT Filed: Oct. 30, 2013

(86) PCT No.: PCT/SE2013/051266
§ 371 (c)(1),
(2) Date: Apr. 20, 2015

(87) PCT Pub. No.: WO2014/070087
PCT Pub. Date: May 8, 2014

(65) Prior Publication Data
US 2015/0250130 A1    Sep. 10, 2015

Related U.S. Application Data

(60) Provisional application No. 61/721,067, filed on Nov. 1, 2012.

(30) Foreign Application Priority Data

Nov. 1, 2012 (SE) ........................................ 1251234

(51) Int. Cl.
*A01J 5/007* (2006.01)
*G05B 15/02* (2006.01)

(52) U.S. Cl.
CPC ........ *A01J 5/007* (2013.01); *G05B 15/02* (2013.01)

(58) Field of Classification Search
CPC ............... A01J 5/007; A01J 5/16; A01J 5/01; G05B 15/02
USPC ....................................................... 119/14.02
See application file for complete search history.

(56) References Cited

U.S. PATENT DOCUMENTS

| 4,011,838 A | 3/1977 | Nordegren et al. |
| 5,054,425 A | 10/1991 | Grimm et al. |

(Continued)

FOREIGN PATENT DOCUMENTS

| DE | 41 13 699 A1 | 10/1992 |
| EP | 0 403 549 B1 | 10/1992 |

(Continued)

OTHER PUBLICATIONS

International—Type Search Report, dated Apr. 22, 2013, from corresponding PCT application.

(Continued)

*Primary Examiner* — Korie H Chan
(74) *Attorney, Agent, or Firm* — Young & Thompson

(57) ABSTRACT

A method, computer program, and arrangement for controlling milking by a milking device, wherein probability values are associated with different milking parameter settings capable of being used for the milking of a milk producing animal, a milking parameter setting is drawn from among the different milking parameter settings based on the probability values for the different milking parameter settings, a milking of the milk producing animal is controlled using the drawn milking parameter setting, a milk flow is sensed from the milk producing animal during the milking, the probability values for the different milking parameter settings are updated based on the sensed milk flow, a further milking parameter setting among the different milking parameter settings is drawn based on the updated probability values for the different milking parameter settings, and the further milking parameter setting is used to control a following milking of the milk producing animal.

19 Claims, 2 Drawing Sheets

(56) References Cited

U.S. PATENT DOCUMENTS

| | | |
|---|---|---|
| 5,152,246 A | 10/1992 | Wakui et al. |
| 6,405,672 B1 | 6/2002 | De Mol et al. |
| 2007/0283893 A1 | 12/2007 | Schuster |

FOREIGN PATENT DOCUMENTS

| | | |
|---|---|---|
| EP | 0 727 137 A1 | 8/1996 |
| EP | 0 679 331 B1 | 6/2002 |
| EP | 0 954 962 B1 | 7/2003 |
| EP | 1 839 483 A1 | 10/2007 |
| RU | 2311022 C1 | 11/2007 |
| SU | 1509004 A1 | 9/1989 |
| SU | 1704718 A1 | 1/1992 |
| WO | 01/19169 A1 | 3/2001 |
| WO | 01/37646 A1 | 5/2001 |
| WO | 2006/068581 A1 | 6/2006 |
| WO | 2006/685582 A1 | 6/2006 |
| WO | 2009/085007 A1 | 7/2009 |
| WO | 2010/074556 A1 | 7/2010 |

OTHER PUBLICATIONS

International Search Report, dated Feb. 11, 2014, from corresponding PCT application.

Supplementary International Search Report, dated Dec. 26, 2014, from corresponding PCT application.

METHOD, COMPUTER PROGRAM, AND COMPUTER PROGRAM PRODUCT FOR CONTROLLING THE MILKING BY A MILKING DEVICE, AND A MILKING ARRANGEMENT

TECHNICAL FIELD OF THE INVENTION

The present invention relates generally to dairy farming and to milking of dairy animals therein. Particularly, the invention relates to a method, a computer program, and a computer program product for controlling the milking by a milking device, and to a milking arrangement.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time, while, naturally, ethical aspects as well as animal care are considered.

Machine milking, as known in the art, generally utilizes teat cups and vacuum sources to perform the milking function. In such systems each teat is contained within a teat cup having a teat receiving liner inside the teat cup shell. A milking vacuum is applied to the interior of each teat receiving liner to draw the milk from the teat, with the teat receiving liners periodically opened and collapsed by applications of a pulsation vacuum between the teat receiving liner and the inside of the teat cup shell. This periodic working of the teat receiving liners results in the periodic flow of milk from each teat into a receiving vessel, and constitutes the actual milking of the cow.

Typically the vacuum parameters used, e.g. milking vacuum, high and low pulsation vacuum, pulsation ratio, and pulsation rate, are the same for all milking animals milked by a milking machine.

U.S. Pat. No. 4,011,838 and U.S. Pat. No. 5,054,425 and EP 0954962 B1, EP 0679331 B1, and EP 0403549 B1 disclose different milking systems for improving the milking. However, they fail to disclose how to obtain animal individual milking, which is optimized for each single milking animal.

WO 2006/068581 discloses a method for controlling the milking by a milking machine comprising the steps of: (i) controlling a milking vacuum so that the milking vacuum is varied through the vacuum levels of a given range, while a milking animal is milked by the aid of the milking vacuum; (ii) monitoring a milk flow from the milking animal during the variation of the vacuum levels; (iii) setting the milking vacuum to the lowest vacuum level of the given range, for which the milk flow from the milking animal is at least a given fraction of the highest milk flow monitored while the milking vacuum is varied; and (iv) keeping the milking vacuum at the set vacuum level during a following part of the milking of the milking animal.

WO 2009/085007 discloses a method for controlling the milking by a milking machine, which comprises a plurality of teat cups, each teat cup having a flexible teat receiving liner arranged inside a rigid teat cup shell, wherein, during milking, a working vacuum is applied to the interior of the teat receiving liner of each teat cup to draw milk from a respective teat of a milking animal while the teat receiving liner of the respective teat cup is periodically opened and collapsed by application of a pulsation vacuum between the teat receiving liner and the teat cup shell. According to the method a flow level of milk drawn from the milking animal is measured and, if the measured flow level is above a threshold, the pulsation ratio of the periodic opening and collapsing of the teat receiving liner of one or more of the teat cups is decreased for a following part of the milking or for a following milking of the milking animal.

SUMMARY OF THE INVENTION

A problem with the teachings of WO 2006/068581 is that it would be very difficult to accurately determine the milk flow for a plurality of vacuum levels while a milking animal is milked since the milk flow fluctuates heavily. The approach relies on a test period during which vacuum levels are tested and on a following period during which an optimum vacuum level is used. It may be difficult to know when the vacuum levels ought to be tested and for how long time the optimum vacuum level is optimum.

A problem with the teachings of WO 2009/085007 is that it is directed towards the decrease of the pulsation ratio if the milk flow is above a threshold, i.e. the teats of the milking animal is treated more gently if the milk flow is high enough. It does not solve the problem of how to optimize the pulsation ratio to obtain a maximum milk throughput.

It is therefore an object of the present invention to provide a method for controlling the milking by a milking device, by which method the milking production is increased, and the animal treatment is improved.

It is a further object of the invention to provide such a method, which is accurate, precise, efficient, reliable, of low cost, and easy to implement.

It is still a further object of the present invention to provide a computer program and a computer program product for carrying out a method of the above-kind.

It is yet a further object of the present invention to provide an arrangement to be used with a milking system, wherein the arrangement includes a process and control device capable of carrying out a method fulfilling the above-mentioned objects.

These objects, among others, are attained by the methods, the computer program, the computer program product, and the arrangements as defined in the appended patent claims.

In a first aspect there is provided a method for controlling the milking by a milking device featuring the following steps: providing probability values for different milking parameter settings capable of being used for the milking of a milk producing animal, the sum of the probability values being one; drawing a milking parameter setting among the different milking parameter settings based on the probability values for the different milking parameter settings; controlling a milking of the milk producing animal such that the drawn milking parameter setting is used during the milking; fetching a sensed value of the milk flow from the milk producing animal during the milking; updating the probability values for the different milking parameter settings based on the sensed milk flow while keeping the sum of the probability values equal to one.

Then a further milking parameter setting may be drawn among the different milking parameter settings based on the updated probability values for the different milking parameter settings; and a following milking of the milk producing animal may be controlled such that the drawn further milking parameter setting is used during the following milking.

Further, a further sensed value of the milk flow from the milk producing animal may be fetched during the following milking thereof; and the probability values for the different milking parameter settings may be updated based on the fetched further sensed value of the milk flow.

The steps of drawing a further milking parameter setting; controlling a following milking; fetching a further sensed value of the milk flow; and updating the probability values for the different milking parameter settings based on the fetched further sensed value of the milk flow may be repeated one or more times, such as e.g. in connection with each milking of the milk producing animal.

By means of the above aspect, the overall milk production can be optimized. The milk production can be maximized, while the animal care is maintained or even improved. Each milking producing animal can be exposed to an individually drawn milking parameter setting each time the milk producing animal is milked.

As compared to the use of the same milking parameter setting for all milking animals, the present invention provides for higher milk throughput since higher flows of milk can be obtained.

The different milking parameter settings comprise different vacuum setting for the milking vacuum and/or the pulsation vacuum. In particular, the different milking parameter settings may comprise any of pulsation ratio values, pulsation rate values, pulsation vacuum values, milking vacuums, and/or actual teat tip vacuum levels.

In one embodiment the different milking parameter settings comprise different values of the time period of the high pulse vacuum and/or different values of the time period of the low pulse vacuum of each pulsation cycle of the pulsation vacuum.

In another embodiment the different milking parameter settings comprise different pulse ratio values such as e.g. 60:40, 65:35, 70:30, and 75:25, while the other vacuum settings are equal for the different milking parameter settings.

The inventor has discovered that by optimizing such milking parameter settings individually for each milk producing animal, the milk throughput can be increased. In particular, the use of different pulse ratio values may increase the milk throughput considerably. Preliminary tests show that the milk throughput for a herd may increase with up to about 8%.

The probability values may be updated in a plurality of manners. For instance, they may be updated based on the last sensed milk flow as compared with historical milk flows from the milk producing animal. For instance, the last sensed milk flow may be compared with milk flows from the milk producing animal as sensed during previous milkings performed with the same milking parameter setting, with different milking parameter setting(s), or with any milk parameter setting. The idea is that milk parameter settings giving high milk flows will have their probability values increased and milk parameter settings giving low milk flows will have their probability values decreased.

Alternatively, mean values, optionally weighted mean values, of the last sensed milk flows from the milk producing animal during the milking and the previous milkings may be calculated individually for each of the milking parameter settings used; and the probability value for the milking parameter setting having highest mean value may be increased and the probability values for the other ones of the milking parameter settings may be decreased at each updating.

Hereby, it can be assured that the most probable milking parameter setting(s) will give the highest milk flow(s). The introduction of a minimum probability value, below which a probability value will never be decreased, assures that all milking parameter settings will have a probability higher than zero, and thus will eventually be used for a milking. A high milk flow at that instant will cause the probability value for that milking parameter setting to be increased. A dynamic milk control method is thus obtained, which adapts continuously to any changes which would cause a different milking parameter setting to be optimum at some instant, thereby maximizing the milk throughput.

In one embodiment, the probability values for different milking parameter settings are updated according to the following. Values of the milk flows from the milk producing animal as sensed during previous milkings are fetched and a mean value of them is calculated. The previous milkings, during which the milk flows are sensed, may be all milkings during a certain period and may be milking performed with any kind of milking parameter setting. The mean value may be calculated as an unweighted mean value or as a weighted mean value such that e.g. sensed milk flows from the milk producing animal during later ones of the previous milkings have higher weights than sensed milk flows from the milk producing animal during earlier ones of the previous milkings.

The sensed milk flow from the milk producing animal during the last milking is compared with the calculated mean value and if the comparison reveals that the sensed milk flow from the milk producing animal during the last milking is higher than the calculated mean value of the sensed milk flows from the milk producing animal during previous milkings, the probability value for the last drawn milking parameter setting is increased and each of the probability values for the other ones of the different milking parameter settings is decreased, optionally provided that it has not yet reached a minimum probability value. Still, the sum of the probability values has to be one. If the sensed milk flow from the milk producing animal during the last milking is lower than the mean value of the sensed milk flows from the milk producing animal during previous milkings, the probability values for the different milking parameter settings may be kept unchanged.

Hereby, a simple and robust algorithm for updating the probability values is obtained. It assures that in the long run, the probability value(s) for the milking parameter setting(s) giving highest milk flows will be maximized, while the probability value(s) for the milking parameter setting(s) giving lowest milk flows will be minimized, e.g. equal to a minimum probability value. If such milking parameter setting, which has a low probability value, e.g. close or equal to the minimum probability value, at a later instance gives a higher milk flow, its probability value will be increased. The determination of the milking parameter setting to be used for each milking, may bear a resemblance to dice rolling, but with a dice which may look different each time and which may be loaded to favor some results over others.

The method can be implemented individually for each milk producing animal or individually for each, or each two, of the teats of the milk producing animal. Hereby, the milk parameters may set and optimized for each milk producing unit (udder quarter for a cow) individually, thereby further improving the overall milk production.

In a second aspect there is provided a milking arrangement comprising a milking device, and a process and control device including a processor and a computer program product, wherein the computer program product stores instructions that, when executed by the processor, cause the process and control device to (i) provide probability values for different milking parameter settings, such as e.g. different pulse ratio settings, capable of being used for the milking of a milk producing animal, the sum of the probability values being one, (ii) draw a milking parameter setting among the different milking parameter settings based on the probability values for the different milking parameter settings, (iii) control a milking of the milk producing animal such that the drawn milking parameter setting is used during the milking, (iv) fetch a sensed value of the milk flow from the milk producing animal during the milking, and (v) update the probability values for the different milking parameter settings based on the sensed milk flow The computer program product may store instructions that, when executed by the processor, cause the process and control device to (vi) draw a further milking parameter setting among the different milking parameter settings based on the updated probability values for the different milking parameter settings, (vii) control a following milking of the milk producing animal such that the drawn further milking parameter setting is used during the following milking, and optionally (viii) fetch a further sensed milk flow from the milk producing animal during the following milking; and (iv) update the probability values for the different milking parameter settings based on the fetched further sensed milk flow.

The invention may revolutionize automatic milking and provide true animal individual, and even teat individual, milking in a robust and effective manner, by providing an adaptive approach, wherein testing of milking parameter settings can be performed continuously during milk production. The milk flow will be increased while the teats of the milk producing animals can be treated more gentle than today. Updated probability values for the different milking parameter settings may be provided throughout the entire lactation for each of the milk producing animals.

Further characteristics of the invention and advantages thereof, will be evident from the detailed description of preferred embodiments of the present invention given hereinafter and the accompanying FIGS. 1-4, which are given by way of illustration only and thus, are not limitative of the present invention.

DETAILED DESCRIPTION OF EMBODIMENTS

Figure 1:
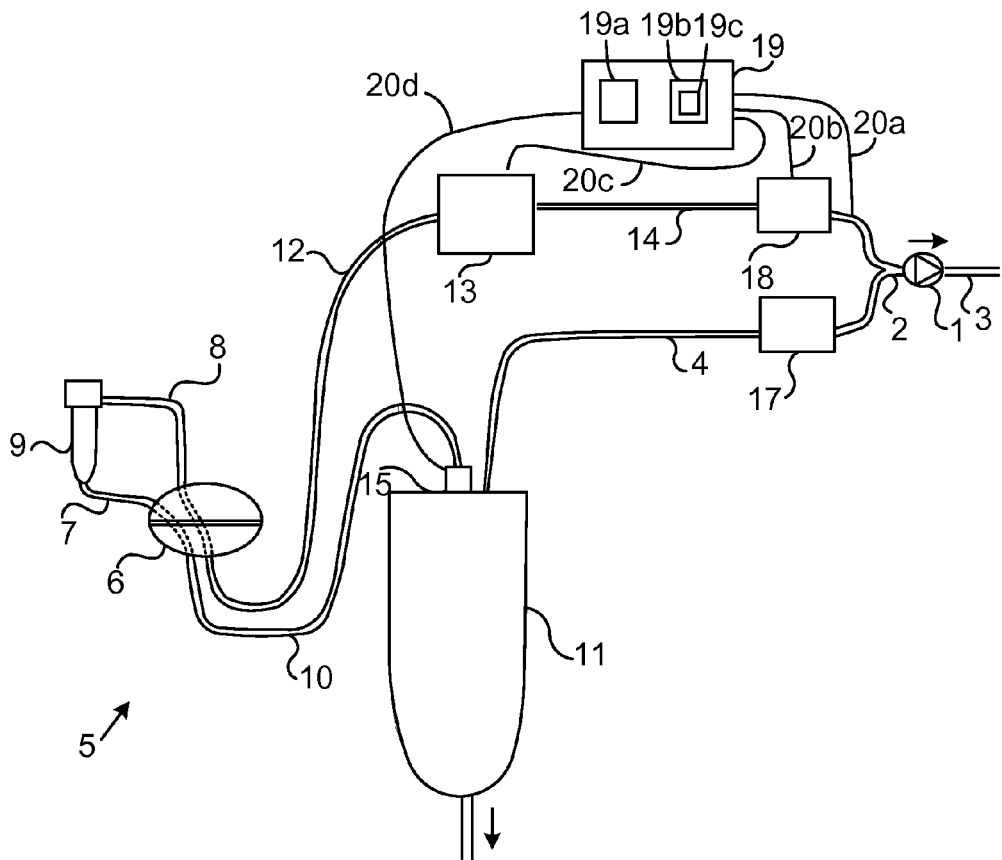
FIG. 1 illustrates schematically main components of a milking system.

A milking system according to an embodiment is partly disclosed in FIG. 1. A vacuum pump 1 has a suction side 2 and a pressure side 3, wherein the suction side 2 of the vacuum pump 1 is via a vacuum conduit 4 connected to a milking device 5.

The milking device 5 comprises an optional milking claw 6, which, via a milk tube 7 and a pulse tube 8, is connected to a teat cup 9 provided to be attached to a teat of an animal, such as a cow, to be milked. Of course, the milking device 5 may comprise more than one milking claw and each milking claw may be connected to more than one teat cup. In case the animals are cows four teat cups are needed for the milking of each animal.

Figure 2:
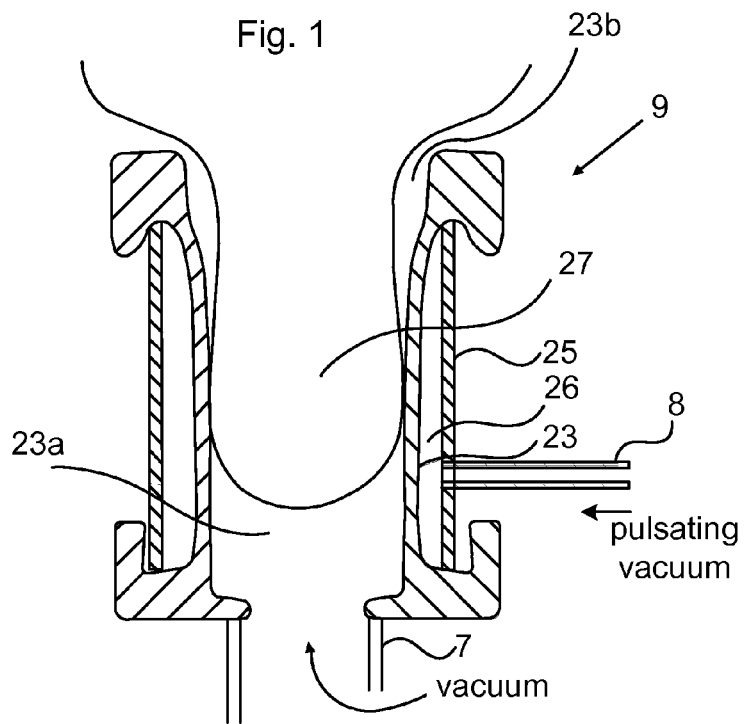
FIG. 2 illustrates schematically, in a cross sectional view, a teat cup of the milking system of FIG. 1.

The teat cup 9, which is shown in greater detail in FIG. 2, has a flexible teat receiving liner 23 arranged inside a rigid teat cup shell 25. The flexible teat receiving liner 23 defines a teat receiving opening in an upper interior part 23b thereof for receiving a teat 27 of an animal to be milked. A lower interior part 23a of the flexible teat receiving liner 23 is connected to the milk tube 7. The annular space 26 formed between the flexible teat receiving liner 23 and the rigid teat cup shell 25 is connected to the pulse tube 8.

The milking device 5 further comprises a receiving vessel 11 which is connected to the teat cup 9 via the milk tube 7, the optional milking claw 6, and a further milk tube 10. The receiving vessel 11, which is connected to the vacuum conduit 4, may be provided with a separator for intermittently removing separated liquid and for preventing that liquid is introduced in the vacuum conduit 4.

Furthermore, a pulsator 13 is connected to the teat cup 9 via the pulse tube 8, the optional milking claw 6, and a further pulse tube 12. The pulsator 13 may be connected, as illustrated, to the vacuum pump 1 via a further vacuum conduit 14 in order to be capable of controlling the pulsation and milking vacuum levels independently of each other. Alternatively, the pulsator 13 is connected to the vacuum conduit 4 and uses the same vacuum regulation as is used for the milk tube 7.

The vacuum pump 1 sucks a flow of air from the milking device 5 via the vacuum conduits 4 and 14. Hereby, a milking vacuum is produced in the lower interior part 23a of the teat receiving liner 23 of the teat cup 9 via the vacuum conduit 4, the receiving vessel 11, and the milk tubes 10 and 7. Similarly, a pulsation vacuum is produced in the annular space 26 between the teat receiving liner 23 and the teat cup shell 25 via the further vacuum conduit 14, the pulsator 13, and the pulse tubes 12 and 8. The pulsation vacuum varies during a pulsation cycle, for instance between atmospheric pressure and a maximum pulsation vacuum and causes the teat receiving liner 23 to periodically open and collapse. By means of the applied milking and pulsation vacuums, milk is drawn from the teat of an animal to the receiving vessel 11.

A milk flow meter or other milk quantity measuring device 15 is provided e.g. at the inlet to the receiving vessel 11 to measure the flow or quantity of milk produced during the milking.

The pulsation vacuum level varies cyclically as a function of time during milking. For each pulsation cycle four phases can be identified: a pulse vacuum increasing phase a, a phase of high pulse vacuum b, a pulse vacuum decreasing phase c, and a phase of low pulse vacuum d. The high pulse vacuum may or may not be equal to the milking vacuum and the low pulse vacuum may or may not be equal to atmospheric pressure. The pulsation vacuum can be characterized by the pulsation ratio and the pulsation rate. The pulsation ratio is equal to $(a+b)/(a+b+c+d)$ and the pulsation rate is equal to $1/(a+b+c+d)$.

A control unit 19 is provided for controlling the vacuum levels in the vacuum conduits 4 and 24 via valve arrangements or vacuum regulators 17, 18. The vacuum regulators 17, 18 may each be any kind of regulator that regulates or controls the vacuum in the respective conduits. Further, the control unit 19 is provided for controlling the pulsation ratio and optionally the pulsation rate. To this end, the control unit is provided with a processor 19a, memory 19b, and a suitable computer program 19c stored in the memory 19b and signal connections 20a-c are provided for transferring control signals to the pulsator 13 and to vacuum regulators 17 and 18.

Note that the milking claw 6 is optional; the milk tube 7 may, for each teat cup 9, be directly connected to the receiving vessel 11 and the pulse tube 8 may, for each teat cup 9, be directly connected to the pulsator 13. To obtain teat individual milking, there may be provided four receiving vessels 11, four vacuum conduits 4, and four vacuum regulators 17. Further, teat cup individual pulsation may be realized if there are provided four pulsators 13, and optionally four vacuum conduits 14 and four vacuum regulators 18.

It shall be appreciated that the control unit 19 may be provided for controlling the pulsator 13 only. In such instance separate control device(s) may be provided for controlling the vacuum regulators 17 and 18.

Further, the milk flow meter or the other milk quantity measuring device 15 is connected the control unit 19 via a signal connection god so that the control unit 19 may receive the measured flow or quantity of milk drawn from the animal during milking.

Generally, the memory 19b or any other memory may store the computer program 19c, which may comprise computer program code or instructions that, when executed by the processor 19a, cause the process and control device 19 to execute any of the methods disclosed below.

Figure 3:
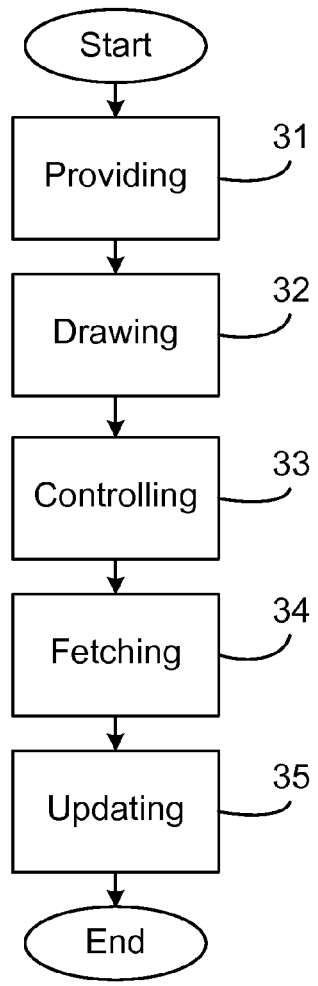
FIG. 3 is a flow scheme of a method for controlling the milking by a milking device.

FIG. 3 is a flow scheme of a method for controlling the milking by a milking device, e.g. by the milking device 5 disclosed above.

Probability values for different milking parameter settings capable of being used for the milking of an animal are, in a step 31, provided, wherein the sum of the probability values is one. The different milking parameter settings may comprise any of pulsation ratio values, pulsation rate values, pulsation vacuum values, milking vacuums, and/or actual teat tip vacuum levels.

In one embodiment the different milking parameter settings are the following pulse ratio values: 60:40, 65:35, 70:30, and 75:25. The probability values may be provided in a number of manners, e.g. arbitrary or depending on some knowledge regarding the animal's milk production, or other animals' milk production, for the different pulse ratio values. In one embodiment, the probability values for the pulse ratio values: 60:40, 65:35, 70:30, and 75:25 may be provided as 0.25, 0.25, 0.25, and 0.25.

It shall be appreciated that the probability values may be provided, and later updated or amended, while always ensuring that each of the probability values is above a minimum probability value which is higher than zero and below a maximum probability value which is lower than one. In one embodiment, the probability values for the pulse ratio values: 60:40, 65:35, 70:30, and 75:25 are always kept between 0.1 and 0.7.

Next, a milking parameter setting is, in a step 32, drawn among the different milking parameter settings based on the probability values for the different milking parameter settings. That is, given the example above with probability values 0.25, 0.25, 0.25, and 0.25, anyone of the pulse ratio values: 60:40, 65:35, 70:30, and 75:25 would have equal chance of being drawn. On the other hand, if the probability values for the pulse ratio values: 60:40, 65:35, 70:30, and 75:25 would have been provided as 0.125, 0.50, 0.25, and 0.125, the pulse ratio value 65:35 would have two times higher probability of being drawn than the pulse ratio value 70:30 and four times higher probability of being drawn than the pulse ratios 60:40 and 75:25.

The milking of the animal is then, in step 33, controlled such that the drawn milking parameter setting is used during the milking, and a sensed value of the milk flow from the animal during the milking, is, in a step 34, fetched. The milk flow may e.g. be sensed by the milk flow meter or the other milk quantity measuring device 15 of the milking device 5, and it may be a maximum milk flow, a mean milk flow, or a weighted mean milk flow, wherein the mean value is calculated during a selected time frame during the milking.

Thereafter, the probability values for the different milking parameter settings are, in a step 35 updated based on the sensed milk flow while keeping the sum of the probability values equal to one. This may be done in a plurality of manners, to be discussed below, inter alia, with reference to FIG. 4, but generally, a high milk flow for a given milking parameter setting, would give a high, or at least an increased, probability value for that milking parameter setting.

The steps 32 and 33 may then be repeated, e.g. a new draw is made in step 32 based on the updated probability values for the different milking parameter settings, and a following milking of the animal is in step 33 controlled such that the drawn milking parameter setting in the new draw is used during the following milking.

The steps 34 and 35 may also be repeated, e.g. a new sensed values of the milk flow from the animal during the milking, is, in step 34, fetched, and a new update of the probability values for the different milking parameter settings is, in step 35, made based on the new sensed value of the milk flow which is fetched.

In fact, steps 32-35 may form a loop which can be performed a plurality of times, e.g. each day or even each time the animal is milked. In such instance, the probability values are updated frequently and will assure that the milking parameter setting(s) which give(s) highest milk flow(s), will get the highest probability values irrespective of the probability values initially provided in step 31.

This means that the milk production will be increased. Simultaneously, by not allowing any of the probability values for the different milking parameter settings to decrease below a minimum probability value, it is assured that each of the milking parameter settings will be used, at least rarely. This may be necessary in order to check whether such a milking parameter setting at some future instant provides higher milk flows. Further, the animal welfare may be increased if the milking parameter settings are varied from time to time.

It shall be appreciated that the above method can be performed for each of the animals in a herd separately since different milking parameter settings may be optimum choices for different animals. The method may thus be implemented on an udder individual level.

Alternatively, the method may be implemented individually for each, or each two, of the teats of the animal. However, this calls for a milking system wherein the milking vacuum and/or the pulsation vacuum is controlled on a teat cup individual basis, or at least individually for each two teat cups. In such embodiment, the milk flow from each teat or each two teats has also to be measured separately.

The probability values for the different milking parameter settings, which are updated based on the last sensed milk flow in step 35, may in particular be updated based on the last sensed milk flow as compared with historical milk flows from the animal. For instance, the last sensed milk flow may be compared with milk flows from the animal as sensed during previous milkings performed with the same milking parameter setting, with different milking parameter setting(s), or with any milk parameter setting.

Figure 4:
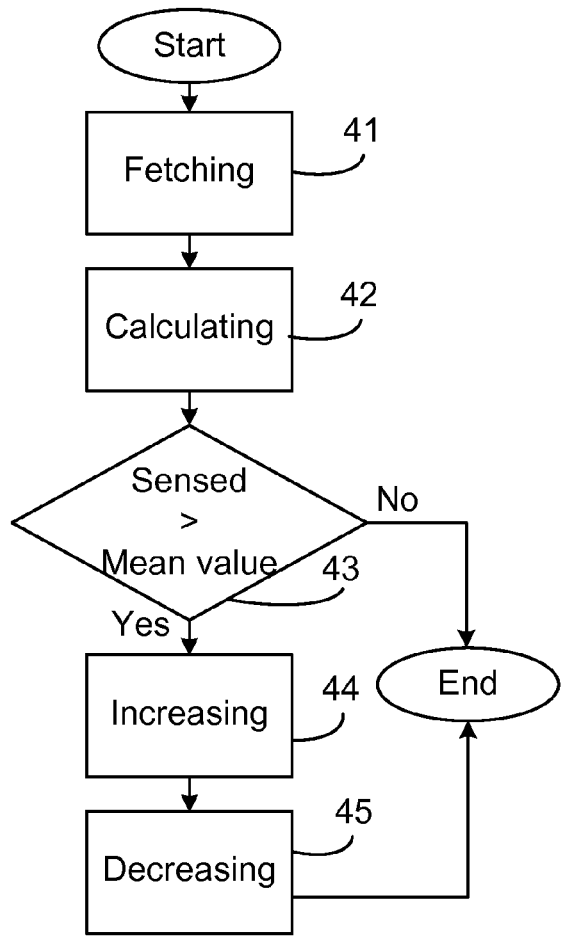
FIG. 4 is a flow scheme of a method for updating probability values for different milking parameter settings, which may be used in the method of FIG. 3.

FIG. 4 is a flow scheme of a method for updating probability values for different milking parameter settings, which may be used in the method of FIG. 3. Values of the milk flows from the animal as sensed during previous milkings are, in a step 41, fetched, and a mean value of them is, in a step 42, calculated.

The previous milkings, during which the milk flows are sensed, may be all milkings during a certain period backwards in time, such as a number of days, e.g. 20 days, and may be milkings performed with any kind of milking parameter setting.

The mean value may be calculated as an unweighted mean value or as a weighted mean value such that sensed milk flows from the animal during later ones of the previous milkings have higher weights than sensed milk flows from the animal during earlier ones of the previous milkings.

Next, the sensed milk flow from the animal during the last milking is, in a step 43, compared with the calculated mean value.

If the comparison reveals that the sensed milk flow from the animal during the last milking is higher than the calculated mean value of the sensed milk flows from the animal during previous milkings, the probability value for the last drawn milking parameter setting is, in a step 44, increased, optionally provided that it has not yet reached a maximum probability value, and each of the probability values for the other ones of the different milking parameter settings is, in a step 45, decreased, optionally provided that it has not yet reached a minimum probability value, after which the method is ended.

If, on the other hand, the sensed milk flow from the animal during the last milking is lower than the mean value of the sensed milk flows from the animal during previous milkings, the probability values for the different milking parameter settings may be kept unchanged, and the method is ended.

For instance, in the example above with the pulse ratio values 60:40, 65:35, 70:30, and 75:25 as the different milking parameter settings, the probability value for the last drawn milking parameter setting may, in step 44, be increased with 0.09, and each of the probability values for the other ones of the different milking parameter settings may, in step 45, be decreased with 0.03.

If the probability values are always kept between 0.1 and 0.7, and the probability value for the last drawn milking parameter is 0.45, and the probability values for the other ones of the different milking parameter settings are 0.11, 0.12, and 0.32, the probability value for the last drawn milking parameter setting is, in step 44, increased with 0.06 only to 0.51, and the probability values for the other ones of the different milking parameter settings are, in step 45, decreased with 0.01 to 0.10, with 0.02 to 0.10, and with 0.03 to 0.29. Since two of the probability values reach the minimum probability value of 0.10 with smaller decreases than 0.03, the probability value that is increased, can only be increased with the sum of the decreases (0.06).

Similarly, if the probability value that is increased, reaches the maximum probability value by an increase of less than 0.09, the sum of the probability values of the other ones of the different milking parameter settings can only be decreased with the increase (less than 0.09).

In an alternative embodiment, the probability values are updated according to the following. Mean values of the last sensed milk flows from the animal are calculated individually for each of the milking parameter settings used, and the probability value for the milking parameter setting having highest mean value is increased and the probability values for the other ones of the milking parameter settings are decreased. In other respects, the updating may be performed as disclosed above.

It shall be appreciated that the milking system, in which the above methods can be employed, encompasses robotized, semi-automated, as well as manual milking systems of various kinds.

The invention relates also to a computer program product which may comprise a computer program adapted to control the milking by a milking device according to any of the methods disclosed above and computer readable means on which the computer program is stored, to a server which offers the computer program to be downloaded, as well as to the computer program itself.

The invention claimed is:

1. A method for controlling a milking device (5) for milking a milk-producing animal, comprising the steps of:
   providing a plurality of different milking parameter settings for a milking parameter that controls an aspect of a milking operation of the milking device (5) for milking the milk-producing animal, and for each of said settings, providing (31) a probability value such that a sum of the probability values of all the settings associated with the milking parameter is one;
   drawing (32) one milking parameter setting among the different milking parameter settings based on the probability values of the different milking parameter settings;
   controlling (33) a milking of the milk producing animal in accordance with the one drawn milking parameter setting is used during the milking;
   fetching (34) a sensed value from a sensor that senses a characteristic of the milk flow from the milk producing animal during the milking;
   updating (35) the probability values for the different milking parameter settings based on the fetched sensed value of the milk flow;
   drawing (32) a further milking parameter setting among the different milking parameter settings based on the updated probability values for the different milking parameter settings;
   controlling (33) a following milking of the milk producing animal such that the drawn further milking parameter setting is used during the following milking;
   fetching (34) a further sensed value from the sensor of the milk flow from the milk producing animal during the following milking; and
   updating (35) the probability values for the different milking parameter settings based on the fetched further sensed value of the milk flow.

2. The method of claim 1, wherein the steps of drawing (32) a further milking parameter setting, controlling (33) a following milking, fetching (34) a further sensed value of the milk flow; and updating (35) the probability values for the different milking parameter settings based on the fetched further sensed value of the milk flow are repeated one or more times.

3. The method of claim 1, wherein the probability values for the different milking parameter settings are updated based on fetched (41) sensed value of the milk flows from the milk producing animal during previous milkings.

4. The method of claim 3, wherein the step of updating, a mean value of the fetched sensed values of the milk flows from the milk producing animal during previous milkings is calculated, the fetched sensed value of the milk flow from the milk producing animal during the milking is compared (43) with the calculated mean value, and, in the event that the fetched sensed value of the milk flow from the milk producing animal during the milking is higher than the calculated mean value, the probability value for the drawn milking parameter setting is increased (44) and the probability values for the other ones of the different milking parameter settings are decreased (45).

5. The method of claim 4, wherein, in the step of updating, a mean value of the fetched sensed values of the milk flows from the milk producing animal during previous milkings is calculated (42), the fetched sensed value of the milk flow from the milk producing animal during the milking is compared (43) with the calculated mean value, and, in the event that the fetched sensed value of the milk flow from the milk producing animal during the milking is higher than the calculated mean value, the probability value for the drawn milking parameter setting is increased (44) except where the probability value for the drawn milking parameter setting has reached a maximum probability value, and each one of the probability values for the other ones of the different milking parameter settings is decreased (45) except where any of the other ones of the different milking parameter settings has reached a minimum probability value.

6. The method of claim 4, wherein the calculated mean value is a weighted mean value such that a fetched sensed value of the milk flows from the milk producing animal during later ones of the previous milkings have higher weights than fetched sensed values of the milk flows from the milk producing animal during earlier ones of the previous milkings.

7. The method of claim 4, wherein, in the step of updating, the probability values for the different milking parameter settings are kept unchanged if the fetched sensed value of the milk flow from the milk producing animal during the milking is lower than a mean value of the fetched sensed values of the milk flows from the milk producing animal during previous milkings.

8. The method of claim 3, wherein, in the step of updating, mean values of the fetched sensed values of the milk flows from the milk producing animal during the milking and the previous milkings are calculated individually for each of the milking parameter settings used, and a probability value for the milking parameter setting having highest mean value is increased and the probability values for the other ones of the milking parameter settings are decreased.

9. The method of claim 1, wherein, in the step of updating, no one of the probability values for the different milking parameter settings is decreased below a minimum probability value.

10. The method of claim 1, wherein the different milking parameter settings comprise any of pulsation ratio values, pulsation rate values, pulsation vacuum values, milking vacuums, and/or actual teat tip vacuum levels.

11. The method of claim 1, wherein the different milking parameter settings comprise different values of the time period of the high pulse vacuum and/or different values of the time period of the low pulse vacuum of each pulsation cycle.

12. The method of claim 1, wherein the different milking parameter settings comprise different pulse ratio values.

13. The method of claim 1, wherein the method is implemented individually for each milk producing animal or individually for each, or each two, of the teats of the milk producing animal.

14. A non-transitory computer-readable recording medium having recorded thereon a computer program (19c) for controlling a milking operation by a milking device (5), the computer program comprising computer program code which, upon execution by a CPU of a computer (19), causes the computer to execute the method as claimed in claim 1.

15. The method of claim 12, wherein the pulse ratio values include 60:40, 65:35, 70:30, and 75:25.

16. A milking arrangement comprising a milking device (5), and a process and control device (19) adapted to carry out the method as claimed in claim 1.

17. A milking arrangement, comprising:
a milking device (5), and
a process and control device (19), including a processor (19a) and a memory device having recorded thereon a computer program comprised of instructions that, when executed by the processor, cause the process and control device to:
for a milking parameter that controls an aspect of a milking operation of the milking device (5) for milking the milk-producing animal, provide a plurality of different milking parameter settings, and for each of said settings, provide probability values such that a sum of the probability values of all the settings associated with the milking parameter is one;
draw one milking parameter setting among the different milking parameter settings based on the probability values of the different milking parameter settings;
control a milking of the milk producing animal in accordance with the one drawn milking parameter setting is used during the milking;
fetch a sensed value from a sensor that senses a characteristic of the milk flow from the milk producing animal during the milking;
update the probability values for the different milking parameter settings based on the fetched sensed value of the milk flow;
draw a further milking parameter setting among the different milking parameter settings based on the updated probability values for the different milking parameter settings;
control a following milking of the milk producing animal such that the drawn further milking parameter setting is used during the following milking;
fetch a further sensed value from the sensor of the milk flow from the milk producing animal during the following milking; and
update the probability values for the different milking parameter settings based on the fetched further sensed value of the milk flow.

18. The milking arrangement of claim 17, wherein the computer program product further comprises instructions that, when executed by the processor, cause the process and control device to repeat the following steps one or more times:
drawing (32) a further milking parameter setting;
controlling (33) a following milking;
fetching (34) a further sensed value of the milk flow; and
updating (35) the probability values for the different milking parameter settings based on the fetched further sensed value of the milk flow are repeated one or more times.

19. The milking arrangement of claim 17, wherein the different milking parameter settings values are different pulse ratio settings.

* * * * *